US012651581B2

(12) United States Patent
Song et al.

(10) Patent No.: US 12,651,581 B2
(45) Date of Patent: Jun. 9, 2026

(54) DISPLAY DEVICE AND METHOD OF COMPENSATING FOR DETERIORATION OF DISPLAY PANEL USING THE SAME

(71) Applicant: Samsung Display Co., LTD., Yongin-si (KR)

(72) Inventors: Hee-Kwang Song, Yongin-si (KR); Sangkyung Lee, Yongin-si (KR); Shinmoon Kang, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 18/823,005

(22) Filed: Sep. 3, 2024

(65) Prior Publication Data

US 2025/0087183 A1 Mar. 13, 2025

(30) Foreign Application Priority Data

Sep. 11, 2023 (KR) ........................ 10-2023-0120234

(51) Int. Cl.
*G09G 5/10* (2006.01)
*G09G 5/02* (2006.01)

(52) U.S. Cl.
CPC ................. *G09G 5/10* (2013.01); *G09G 5/02* (2013.01); *G09G 2320/0233* (2013.01); *G09G 2320/0242* (2013.01); *G09G 2320/0666* (2013.01)

(58) Field of Classification Search
CPC .... G09G 5/10; G09G 5/20; G09G 2320/0233; G09G 2320/0242; G09G 2320/0666
See application file for complete search history.

(56) References Cited

U.S. PATENT DOCUMENTS

2003/0063053 A1* 4/2003 Yamazaki ............ G09G 3/3241 345/82
2014/0285533 A1* 9/2014 Chun .................. G09G 3/3208 345/83
2023/0137445 A1* 5/2023 Kim .................... H10K 50/841 348/164

FOREIGN PATENT DOCUMENTS

KR 10-2007-0015830 A 2/2007
KR 10-2017-0036938 A 4/2017
KR 10-2018751 B1 11/2019
KR 10-2022-0168009 A 12/2022

* cited by examiner

*Primary Examiner* — Robert J Michaud
(74) *Attorney, Agent, or Firm* — Womble Bond Dickinson (US) LLP

(57) ABSTRACT

A display device includes: a display panel including a pixel including: a red sub-pixel to display a red color; a green sub-pixel to display a green color; and a blue sub-pixel to display a blue color; and a deterioration compensator to compensate for a deterioration of the pixel, and including: a luminance compensator to generate a luminance compensation value of a full color based on an input luminance of the full color; and a color coordinate compensator to: calculate display color coordinates of the red color; display color coordinates of the green color; display color coordinates of the blue color; and a ratio of the luminance compensation value of the full color based on the display color coordinates of the red color, the display color coordinates of the green color, the display color coordinates of the blue color, and input color coordinates of the full color.

18 Claims, 11 Drawing Sheets

DISPLAY DEVICE AND METHOD OF COMPENSATING FOR DETERIORATION OF DISPLAY PANEL USING THE SAME

CROSS-REFERENCE TO RELATED APPLICATION

The present application claims priority to and the benefit of Korean Patent Application No. 10-2023-0120234, filed on Sep. 11, 2023, in the Korean Intellectual Property Office, the entire disclosure of which is incorporated by reference herein.

BACKGROUND

1. Field

Aspects of embodiments of the present disclosure relate to a display device, and a method of compensating for deterioration of a display panel.

2. Description of the Related Art

Generally, a display device may include a display panel and a display panel driver. The display panel includes gate lines, data lines, and pixels. The display panel driver may include a gate driver for providing a gate signal to the gate lines, a data driver for providing a data voltage to the data lines, and a drive controller for controlling the gate driver and the data driver.

Each of the pixels may include a red sub-pixel for displaying a red color, a green sub-pixel for displaying a green color, and a blue sub-pixel for displaying a blue color. The display device may display various colors using the red sub-pixel, the green sub-pixel, and the blue sub-pixel. However, the red sub-pixel, the green sub-pixel, and the blue sub-pixel may deteriorate depending on a use. When the red sub-pixel, the green sub-pixel, and the blue sub-pixel are deteriorated, a luminance change and a color coordinate deviation may occur.

The above information disclosed in this Background section is for enhancement of understanding of the background of the present disclosure, and therefore, it may contain information that does not constitute prior art.

SUMMARY

Embodiments of the present disclosure may be directed to a display device that may prevent or substantially prevent a luminance change and a color coordinate deviation by compensating for a deterioration of a display panel.

Embodiments of the present disclosure may be directed to a method of compensating for a deterioration of a display panel using the display device.

According to one or more embodiments of the present disclosure, a display device includes: a display panel including a pixel, the pixel including: a red sub-pixel configured to display a red color; a green sub-pixel configured to display a green color; and a blue sub-pixel configured to display a blue color; and a deterioration compensator configured to compensate for a deterioration of the pixel, the deterioration compensator including: a luminance compensator configured to generate a luminance compensation value of a full color based on an input luminance of the full color, the luminance compensation value of the full color corresponding to a sum of a luminance compensation value of the red color, a luminance compensation value of the green color, and a luminance compensation value of the blue color; and a color coordinate compensator configured to: calculate display color coordinates of the red color based on a deterioration amount of the red color; calculate display color coordinates of the green color based on a deterioration amount of the green color; calculate display color coordinates of the blue color based on a deterioration amount of the blue color; and calculate a ratio of the luminance compensation value of the full color based on the display color coordinates of the red color, the display color coordinates of the green color, the display color coordinates of the blue color, and input color coordinates of the full color, the ratio of the luminance compensation value of the full color corresponding to a ratio between the luminance compensation value of the red color, the luminance compensation value of the green color, and the luminance compensation value of the blue color.

In an embodiment, the deterioration compensator may be configured to compensate for a display luminance of the full color to the input luminance of the full color based on the luminance compensation value of the red color, the luminance compensation value of the green color, and the luminance compensation value of the blue color.

In an embodiment, the ratio of the luminance compensation value of the full color may be different from a ratio of the input luminance of the full color, which may correspond to a ratio between an input luminance of the red color, an input luminance of the green color, and an input luminance of the blue color.

In an embodiment, the deterioration compensator may be configured to compensate for display color coordinates of the full color to the input color coordinates of the full color based on the ratio of the luminance compensation value of the full color.

In an embodiment, the deterioration compensator may be configured to calculate the input color coordinates of the full color based on input color coordinates of the red color, input color coordinates of the green color, input color coordinates of the blue color, and the ratio of the input luminance of the full color.

In an embodiment, the deterioration compensator may be configured to: calculate the deterioration amount of the red color by {(input luminance of the red color)−(display luminance of the red color)}*100/(the input luminance of the red color); calculate the deterioration amount of the green color by {(input luminance of the green color)−(display luminance of the green color)}*100/(the input luminance of the green color); and calculate the deterioration amount of the blue color by {(input luminance of the blue color)−(display luminance of the blue color)}*100/(the input luminance of the blue color).

In an embodiment, the deterioration compensator may be configured to calculate an x value of the display color coordinates of the red color according to Rx'=Rx+coff1-1*DET_R/50, and a y value of the display color coordinates of the red color according to Ry'=Ry+coff1-2*DET_R/50. Here, Rx' may be the x value of the display color coordinates of the red color, Rx may be an x value of input color coordinates of the red color, coff1-1 may be an x value coefficient of the red color, DET_R may be the deterioration amount of the red color, Ry' may be the y value of the display color coordinates of the red color, Ry may be a y value of the input color coordinates of the red color, and coff1-2 may be a y value coefficient of the red color.

In an embodiment, coff1-1 may be 2/1000, and coff1-2 may be −25/10000.

In an embodiment, the deterioration compensator may be configured to calculate an x value of the display color coordinates of the green color according to Gx'=Gx+coff2-1*DET_G/50, and a y value of the display color coordinates of the green color according to Gy'=Gy+coff2-2*DET_G/50. Here, Gx' may be the x value of the display color coordinates of the green color, Gx may be an x value of input color coordinates of the green color, coff2-1 may be an x value coefficient of the green color, DET_G may be the deterioration amount of the green color, Gy' may be the y value of the display color coordinates of the green color, Gy may be a y value of the input color coordinates of the green color, and coff2-2 may be a y value coefficient of the green color.

In an embodiment, coff2-1 may be −8/1000, and coff2-2 may be 4/1000.

In an embodiment, the deterioration compensator may be configured to calculate an x value of the display color coordinates of the blue color according to Bx'=Bx+coff3-1*DET_B/50, and a y value of the display color coordinates of the blue color according to By'=By+coff3-2*DET_B/50. Here, Bx' may be the x value of the display color coordinates of the blue color, Bx may be an x value of input color coordinates of the blue color, coff3-1 may be an x value coefficient of the blue color, DET_B may be the deterioration amount of the blue color, By' may be the y value of the display color coordinates of the blue color, By may be a y value of the input color coordinates of the blue color, and coff3-2 may be a y value coefficient of the blue color.

In an embodiment, coff3-1 may be 0/1000, and coff3-2 may be −3/1000.

In an embodiment, the color coordinate compensator may include a lookup table including the ratio of the luminance compensation value of the full color corresponding to the deterioration amount of the red color, the deterioration amount of the green color, and the deterioration amount of the blue color.

In an embodiment, the deterioration compensator may further include: an image inputter configured to receive input image data, the deterioration amount of the red color, the deterioration amount of the green color, and the deterioration amount of the blue color, and provide the received input image data and the deterioration amounts to the luminance compensator and the color coordinate compensator; and an image outputter configured to output a data signal by compensating for the input image data based on the luminance compensation value of the full color and the ratio of the luminance compensation value of the full color.

According to one or more embodiments of the present disclosure, a method of compensating for a deterioration of a display panel, includes: generating a luminance compensation value of a full color based on an input luminance of the full color, the luminance compensation value of the full color corresponding to a sum of a luminance compensation value of a red color, a luminance compensation value of a green color, and a luminance compensation value of a blue color; calculating display color coordinates of the red color based on a deterioration amount of the red color; calculating display color coordinates of the green color based on a deterioration amount of the green color; calculating display color coordinates of the blue color based on a deterioration amount of the blue color; and calculating a ratio of the luminance compensation value of the full color based on the display color coordinates of the red color, the display color coordinates of the green color, the display color coordinates of the blue color, and input color coordinates of the full color, the ratio of the luminance compensation value of the full color corresponding to a ratio between the luminance compensation value of the red color, the luminance compensation value of the green color, and the luminance compensation value of the blue color.

In an embodiment, a display luminance of the full color may be compensated to the input luminance of the full color based on the luminance compensation value of the red color, the luminance compensation value of the green color, and the luminance compensation value of the blue color.

In an embodiment, the ratio of the luminance compensation value of the full color may be different from a ratio of the input luminance of the full color, which may correspond to a ratio between an input luminance of the red color, an input luminance of the green color, and an input luminance of the blue color.

In an embodiment, display color coordinates of the full color may be compensated to the input color coordinates of the full color based on the ratio of the luminance compensation value of the full color.

In an embodiment, the input color coordinates of the full color may be calculated based on input color coordinates of the red color, input color coordinates of the green color, input color coordinates of the blue color, and the ratio of the input luminance of the full color.

In an embodiment, the deterioration amount of the red color may be calculated by {(input luminance of the red color)−(display luminance of the red color)}*100/(the input luminance of the red color), the deterioration amount of the green color may be calculated by {(input luminance of the green color)−(display luminance of the green color)}*100/(the input luminance of the green color), and the deterioration amount of the blue color may be calculated by {(input luminance of the blue color)−(display luminance of the blue color)}*100/(the input luminance of the blue color).

According to one or more embodiments of the present disclosure the luminance compensation value of the full color may be generated based on the input luminance of the full color to prevent or substantially prevent a luminance change of the full color, and/or the ratio of the luminance compensation value of the full color may be adjusted based on the deterioration amount of the red color, the deterioration amount of the green color, and the deterioration amount of the blue color to prevent or substantially prevent a color coordinate deviation of the full color. Accordingly, a display quality of the display device may be improved.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
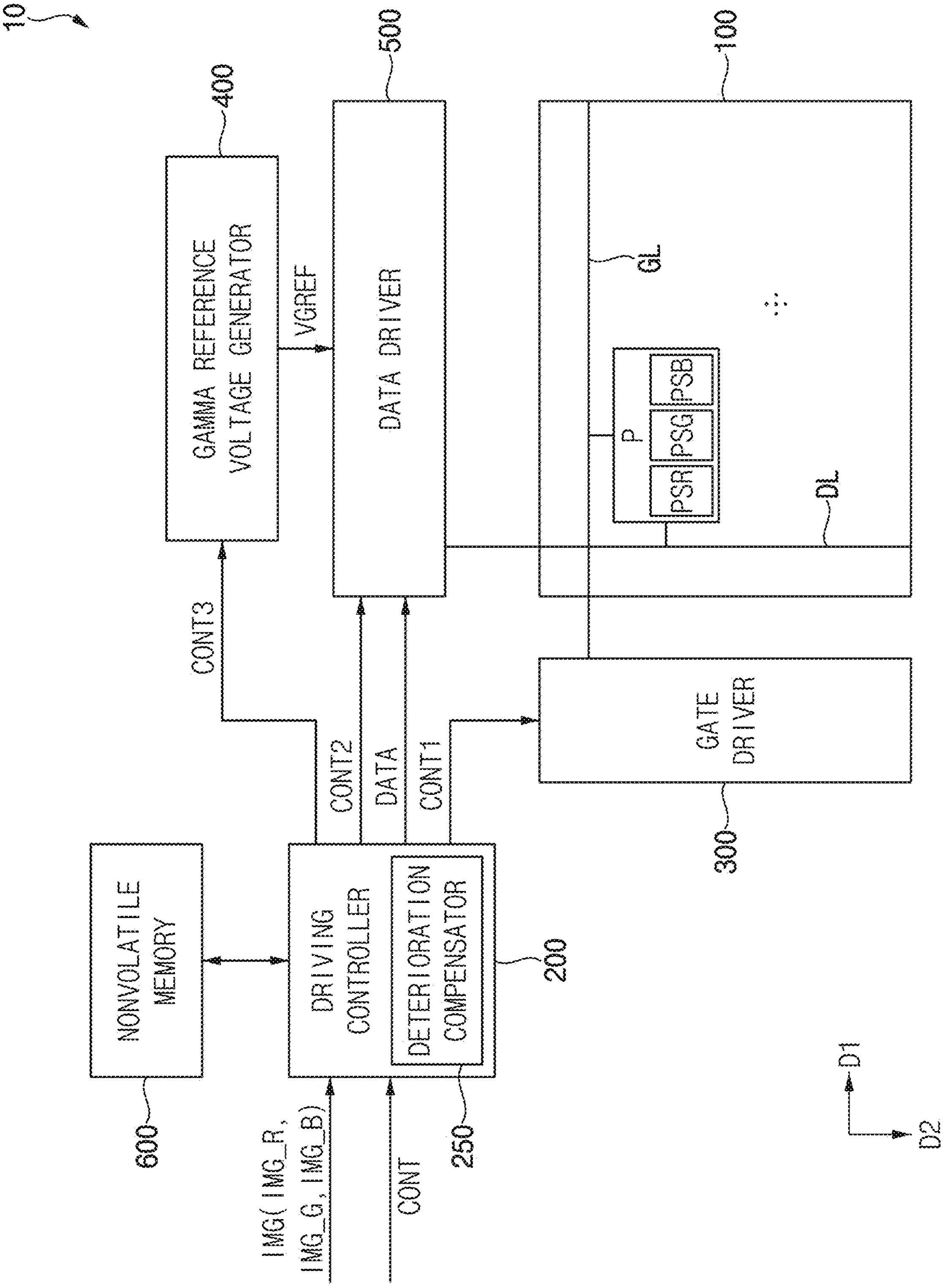
FIG. 1 is a block diagram illustrating a display device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
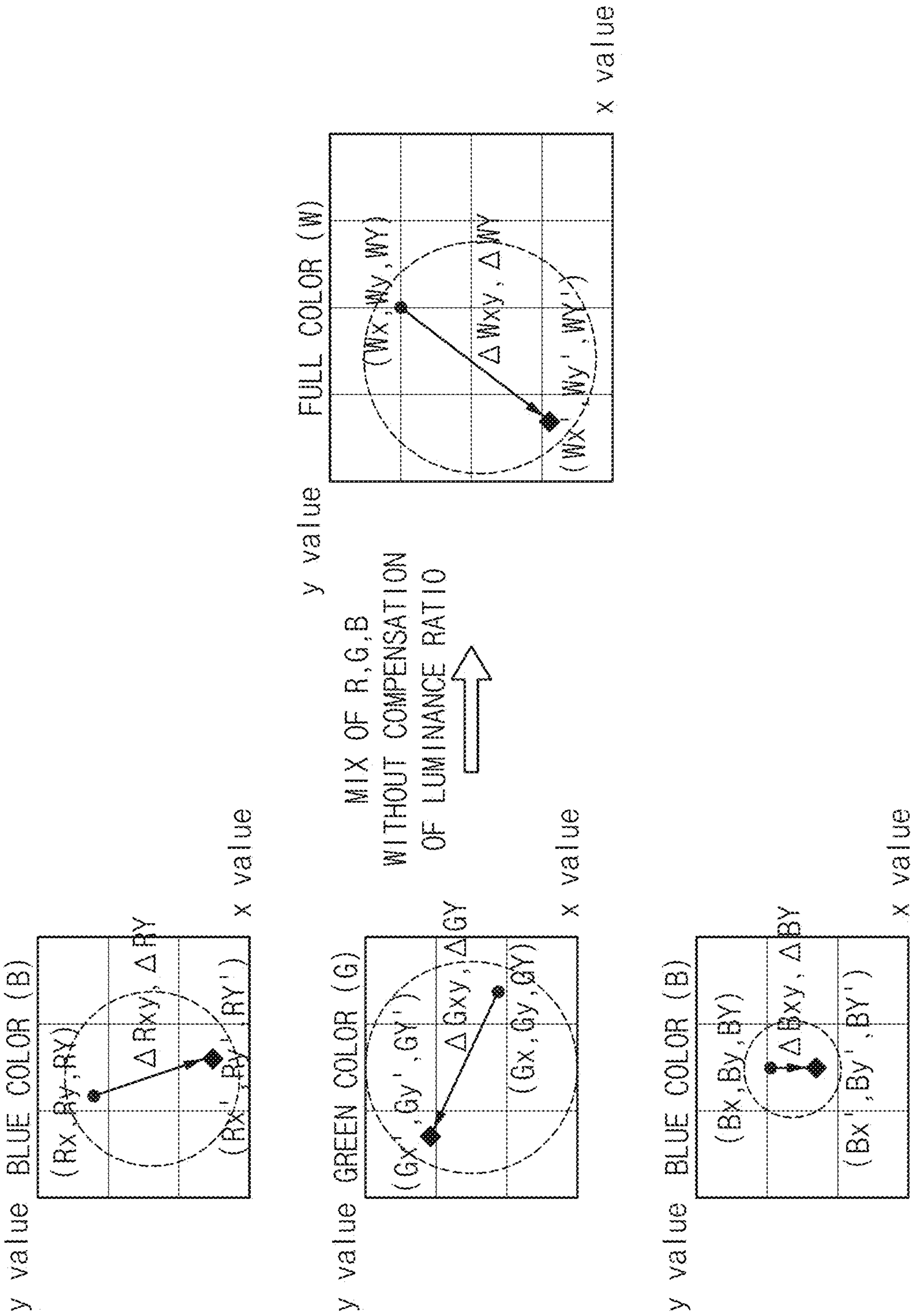
FIG. 2 is a schematic diagram illustrating changes in display color coordinates.
Figure 3:
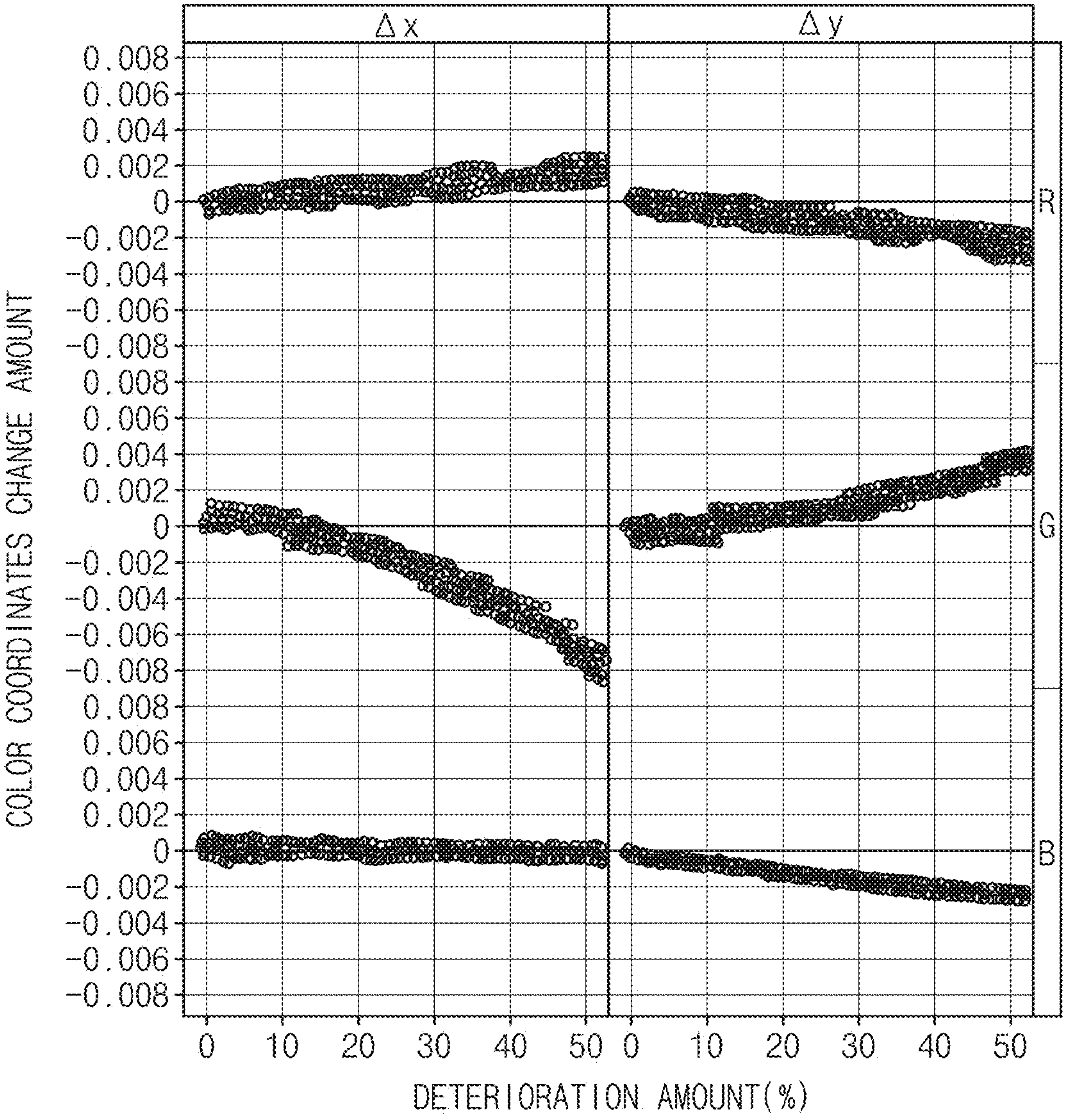
FIG. 3 is a schematic diagram illustrating change amounts in display color coordinates.

FIG. 1 is a block diagram illustrating a display device 10 according to an embodiment of the present disclosure. FIG. 2 is a schematic diagram illustrating changes in display color coordinates. FIG. 3 is a schematic diagram illustrating change amounts in display color coordinates.

Referring to FIGS. 1 to 3, the display device 10 according to an embodiment of the present disclosure may include a display panel 100 and a display panel driver. The display panel driver may include a driving controller 200, a gate driver 300, a gamma reference voltage generator 400, and a data driver 500. The display device 10 may further include a nonvolatile memory 600.

For example, the driving controller 200 and the data driver 500 may be integrally formed with each other. For example, the driving controller 200, the gamma reference voltage generator 400, and the data driver 500 may be integrally formed with each other. A driving module (e.g., a driver or a driving circuit) in which at least the driving controller 200 and the data driver 500 are integrally formed with each other may be referred to as a timing controller embedded data driver (TED).

The display panel 100 may include a display area for displaying an image, and a peripheral area disposed adjacent to the display area.

For example, in the present embodiment, the display panel 100 may be an organic light emitting diode display panel including an organic light emitting diode. However the present disclosure is not limited thereto, and the display panel 100 may be a quantum-dot organic light emitting diode display panel including an organic light emitting diode and a quantum-dot color filter, a quantum-dot nano light emitting diode display panel including a nano light emitting diode and a quantum-dot color filter, or the like.

The display panel 100 may include gate lines GL, data lines DL, and pixels P electrically connected to the gate lines GL and the data lines DL. The gate lines GL may extend in a first direction D1, and the data lines DL may extend in a second direction D2 crossing the first direction D1. Each of the pixels P may include a red sub-pixel PSR for displaying a red color R, a green sub-pixel PSG for displaying a green color G, and a blue sub-pixel PSB for displaying a blue color B. The red sub-pixel PSR, the green sub-pixel PSG, and the blue sub-pixel PSB may display various colors by mixing the red (R), green (G), and blue (B) colors with each other. A color formed by mixing the red color R, the green color G, and the blue color B with each other may be referred to as a full color W.

The driving controller 200 may receive input image data IMG and an input control signal CONT from an external apparatus. For example, the input image data IMG may include red image data IMG_R, green image data IMG_G, and blue image data IMG_B. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate a data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be disposed in the driving controller 200 or may be disposed in the data driver 500.

The data driver 500 may receive the second control signal CONT2 and the data signal DATA from the driving controller 200, and may receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

The nonvolatile memory 600 may store a deterioration amount of the red color R, a deterioration amount of the green color G, and a deterioration amount of the blue color B. The deterioration amount may be generated by accumulating deterioration data for the corresponding sub-pixel PSR, PSG, and/or PSB, and indicates a deterioration degree of the corresponding sub-pixel PSR, PSG, and/or PSB. For example, the deterioration amount may be an increase rate of a display luminance or a decrease rate of the display luminance according to a deterioration time. Information stored in the nonvolatile memory 600 may not be erased, even when the display device 10 is turned off.

The driving controller 200 may include a deterioration compensator 250 for compensating for the deterioration of the pixels P. The deterioration compensator 250 may generate the data signal DATA by compensating the input image data IMG to compensate for the deterioration of each of the red sub-pixel PSR, the green sub-pixel PSG, and the blue sub-pixel PSB.

The red sub-pixel PSR may display the red color R based on the red image data IMG_R, and the red image data IMG_R may include a red grayscale (e.g., a red grayscale value). When the red grayscale is increased, the red sub-pixel PSR may increase a Y value (RY) of input color coordinates Rx, Ry, and RY of the red color R, while maintaining an x value (Rx) of the input color coordinates Rx, Ry, and RY of the red color R and a y value (Ry) of the input color coordinates Rx, Ry, and RY of the red color R. The Y value (RY) of the input color coordinates Rx, Ry, and RY of the red color R may correspond to an input luminance of the red color R. The input color coordinates Rx, Ry, and RY of the red color R may be color coordinates of the red color R displayed by the red sub-pixel PSR before the red sub-pixel PSR is deteriorated. The input luminance of the red color R may be a luminance of the red color R before the red sub-pixel PSR is deteriorated.

The green sub-pixel PSG may display the green color G based on the green image data IMG_G, and the green image data IMG_G may include a green grayscale (e.g., a green grayscale value). When the green grayscale is increased, the green sub-pixel PSG may increase a Y value (GY) of input color coordinates Gx, Gy, and GY of the green color G, while maintaining an x value (Gx) of the input color coordinates Gx, Gy, and GY of the green color G and a y value (Gy) of the input color coordinates Gx, Gy, and GY of the green color G. The Y value (GY) of the input color coordinates Gx, Gy, and GY of the green color G may correspond to an input luminance of the green color G. The input color coordinates Gx, Gy, and GY of the green color G may be color coordinates of the green color G displayed by the green sub-pixel PSG before the green sub-pixel PSG is deteriorated. The input luminance of the green color G may be a luminance of the green color G before the green sub-pixel PSG is deteriorated.

The blue sub-pixel PSB may display the blue color B based on the blue image data IMG_B, and the blue image data IMG_B may include a blue grayscale (e.g., a blue grayscale value). When the blue grayscale is increased, the blue sub-pixel PSB may increase a Y value (BY) of input color coordinates Bx, By, and BY of the blue color B, while maintaining an x value (Bx) of the input color coordinates Bx, By, and BY of the blue color B and a y value (By) of the input color coordinates Bx, By, and BY of the blue color B. The Y value (BY) of the input color coordinates Bx, By, and BY of the blue color B may correspond to an input luminance of the blue color B. The input color coordinates Bx, By, and BY of the blue color B may be color coordinates of the blue color B displayed by the blue sub-pixel PSB before the blue sub-pixel PSB is deteriorated. The input luminance of the blue color B may be a luminance of the blue color B before the blue sub-pixel PSB is deteriorated.

As described above, the red sub-pixel PSR, the green sub-pixel PSG, and the blue sub-pixel PSB may express the full color W by adjusting a ratio of the input luminance of the full color W, which is a ratio between the input luminance of the red color R (e.g., the Y value (RY) of the input color coordinates Rx, Ry, and RY of the red color R), the input luminance of the green color G (e.g., the Y value (GY) of the input color coordinates Gx, Gy, and GY of the green color G), and the input luminance of the blue color B (e.g., the Y value (BY) of the input color coordinates Bx, By, and BY of the blue color B).

The red sub-pixel PSR, the green sub-pixel PSG, and the blue sub-pixel PSB may be deteriorated according to a use or usage. When the red sub-pixel PSR, the green sub-pixel PSG, and the blue sub-pixel PSB are deteriorated, a luminance change and a color coordinate deviation may occur.

When the red sub-pixel PSR is deteriorated, the input color coordinates Rx, Ry, and RY of the red color R may be changed to display color coordinates Rx', Ry', and RY' of the red color R. The display color coordinates Rx', Ry', and RY' of the red color R may be color coordinates of the red color R displayed by the red sub-pixel PSR before or after the red sub-pixel PSR is deteriorated. A luminance change ΔRY of the red color R may occur by a difference between the Y value (RY) of the input color coordinates Rx, Ry, and RY of the red color R and the Y value (RY') of the display color coordinates Rx', Ry', and RY' of the red color R. A color coordinate deviation ΔRxy of the red color R may occur by a difference between the x value (Rx) and the y value (Ry) of the input color coordinates Rx, Ry, and RY of the red color R and the x value (Rx') and the y value (Ry') of the display color coordinates Rx', Ry', and RY' of the red color R.

When the green sub-pixel PSG is deteriorated, the input color coordinates Gx, Gy, and GY of the green color G may be changed to display color coordinates Gx', Gy', and GY' of the green color G. The display color coordinates Gx', Gy', and GY' of the green color G may be the color coordinates of the green color G displayed by the green sub-pixel PSG before or after the green sub-pixel PSG is deteriorated. A luminance change ΔGY of the green color G may occur by a difference between the Y value (GY) of the input color coordinates Gx, Gy, and GY of the green color G and the Y value (GY') of the display color coordinates Gx', Gy', and GY' of the green color G. A color coordinate deviation ΔGxy of the green color G may occur by a difference between the x value (Gx) and the y value (Gy) of the input color coordinates Gx, Gy, and GY of the green color G and the x value (Gx') and the y value (Gy') of the display color coordinates Gx', Gy', and GY' of the green color G.

When the blue sub-pixel PSB is deteriorated, the input color coordinates Bx, By, and BY of the blue color B may be changed to display color coordinates Bx', By', and BY' of the blue color B. The display color coordinates Bx', By', and BY' of the blue color B may be color coordinates of the blue color B displayed by the blue sub-pixel PSB before or after the blue sub-pixel PSB is deteriorated. A luminance change ΔBY of the blue color B may occur by a difference between the Y value (BY) of the input color coordinates Bx, By, and BY of the blue color B and the Y value (BY') of the display color coordinates Bx', By', and BY' of the blue color B. A color coordinate deviation ΔBxy of the blue color B may occur by a difference between the x value (Bx) and the y value (By) of the input color coordinates Bx, By, and BY of the blue color B and the x value (Bx') and the y value (By') of the display color coordinates Bx', By', and BY' of the blue color B.

For example, when the deterioration amount of the red color R (e.g., the reduction rate of the display luminance of the red color R) is about 50%, the x value (Rx') of the display color coordinates Rx', Ry', and RY' of the red color R may be increased by about 2/10000, and the y value (Ry') of the display color coordinates Rx', Ry', and RY' of the red color R may be decreased by about 25/10000. The display luminance of the red color R is the luminance of the red color R before the red sub-pixel PSR is deteriorated. In an embodiment, a deterioration amount DET_R of the red color R may be calculated by {(the input luminance of the red color R)−(the display luminance of the red color R)}*100/(the input luminance of the red color R).

For example, when the deterioration amount of the green color G (e.g., the reduction rate of the display luminance of the green color G) is about 50%, the x value (Gx') of the display color coordinates Gx', Gy', and GY' of the green color G may be decreased by about 8/10000, and the y value (Gy') of the display color coordinates Gx', Gy', and GY' of the green color G may be increased by about 4/1000. The display luminance of the green color G is the luminance of the green color G before the green sub-pixel PSG is deteriorated. In an embodiment, a deterioration amount DET_G of the green color G may be calculated by {(the input luminance of the green color G)−(the display luminance of the green color G)}*100/(the input luminance of the green color G).

For example, when the deterioration amount of the blue color B (e.g., the reduction rate of the display luminance of the blue color B) is about 50%, the x value (Bx') of the display color coordinate Bx', By', and BY' of the blue color B may be increased by about 0, and the y value (By') of the display color coordinate "'Bx', By', and BY' of the blue color B may be decreased by about 3/1000. The display luminance of the blue color B may be the luminance of the blue color B before the blue sub-pixel PSB is deteriorated. In some embodiments, a deterioration amount DET_B of the blue color B may be calculated by {(the input luminance of the blue color B)−(the display luminance of the blue color B)}*100/(the input luminance of the blue color B).

Thus, when at least one of the red sub-pixel PSR, the green sub-pixel PSG, and/or the blue sub-pixel PSB is deteriorated, the input color coordinates Wx, Wy, and WY of the full color W may be changed to display color coordinates Wx', Wy', and WY' of the full color W. The input color coordinates Wx, Wy, and WY of the full color W may be color coordinates of the full color W displayed by the red sub-pixel PSR, the green sub-pixel PSG, and the blue sub-pixel PSB before the red sub-pixel PSR, the green sub-pixel PSG, and the blue sub-pixel PSB are deteriorated. The display color coordinates Wx', Wy', and WY' of the full color W may be color coordinates of the full color W displayed by the red sub-pixel PSR, the green sub-pixel PSG, and the blue sub-pixel PSB before or after at least one of the red sub-pixel PSR, the green sub-pixel PSG, and/or the blue sub-pixel PSB is deteriorated. A luminance change ΔWY of the full color W may occur by a difference between the Y value (WY) of the input color coordinates Wx, Wy, and WY of the full color W and the Y value (WY') of the display color coordinates Wx', Wy', and WY' of the full color W. A color coordinate deviation ΔWxy of the full color W may occur by a difference between the x value (Wx) and the y value (Wy) of the input color coordinates Wx, Wy, and WY of the full color W and the x value (Wx') and the y value (Wy') of the display color coordinates Wx', Wy', and WY' of the full color W.

When the luminance change ΔWY of the full color W and the color coordinate deviation ΔWxy of the full color W exceed a level (e.g., a predetermined level), the luminance change ΔWY of the full color W and the color coordinate deviation ΔWxy of the full color W may be visually recognized by a user, and the display quality of the display device 10 may be decreased. Therefore, the luminance change ΔWY of the full color W and the color coordinate deviation ΔWxy of the full color W may be compensated for.

Figure 4:
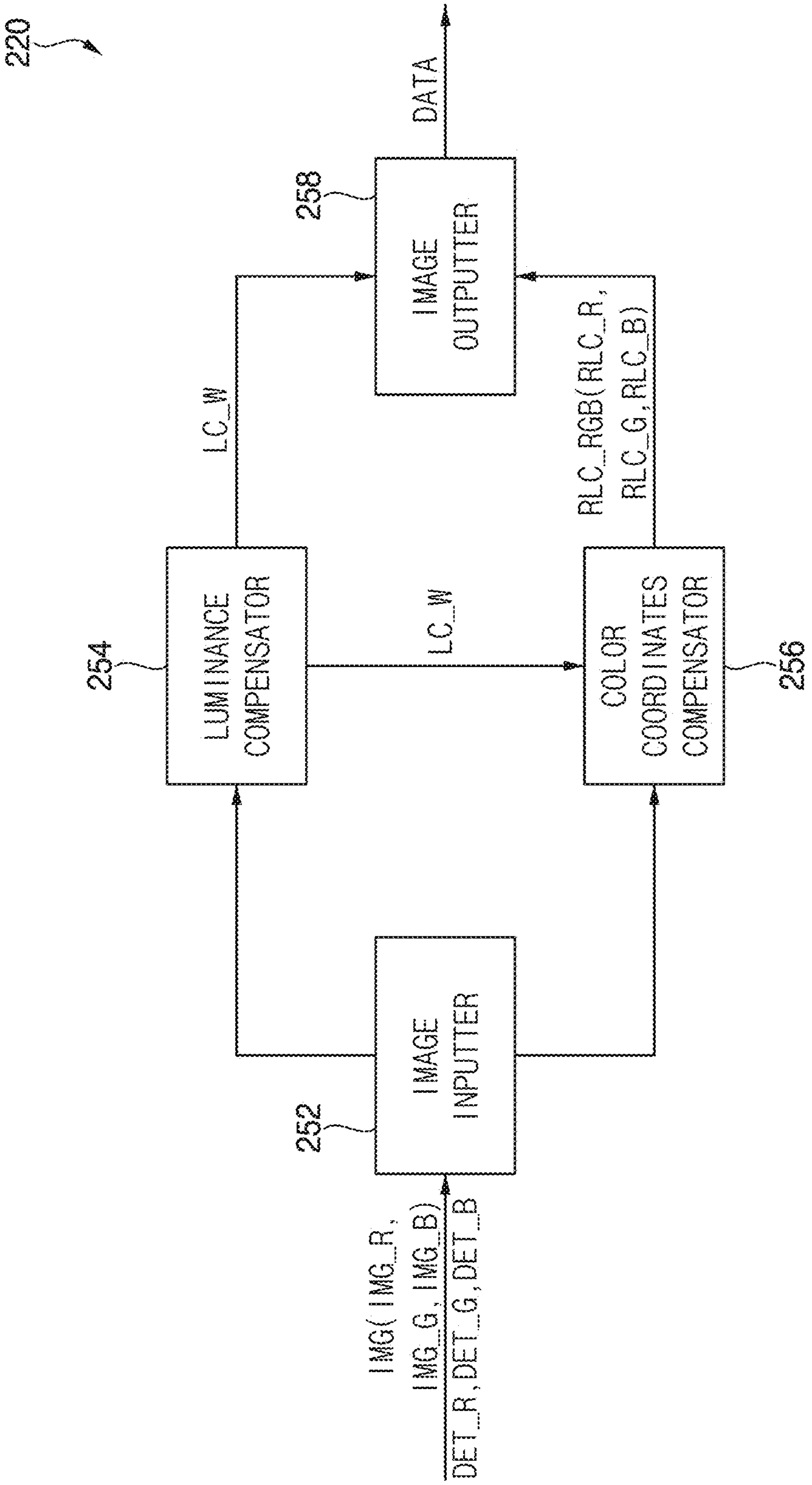
FIG. 4 is a block diagram illustrating a deterioration compensator of FIG. 1.
Figure 5:
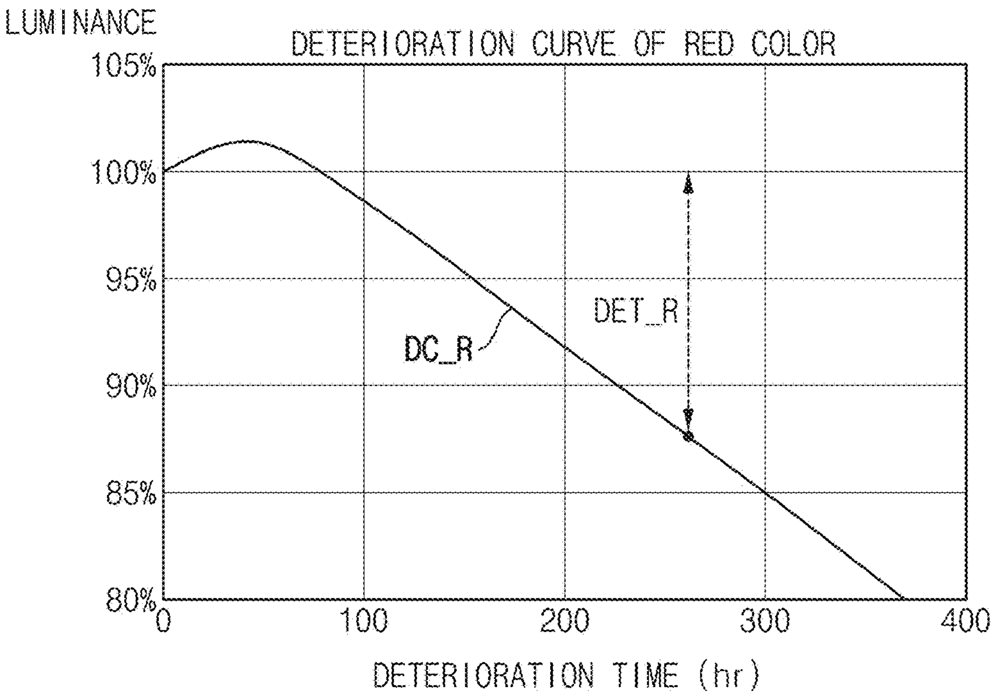
FIGS. 5-7 are graphs illustrating examples of an operation of a luminance compensator of FIG. 4.
Figure 6:
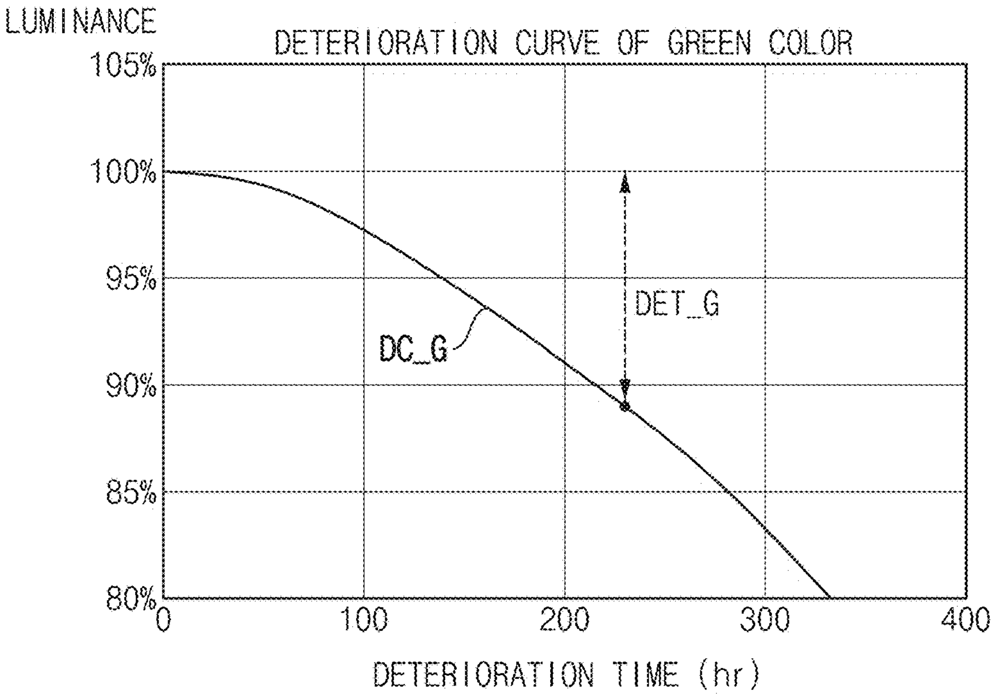
Figure 7:
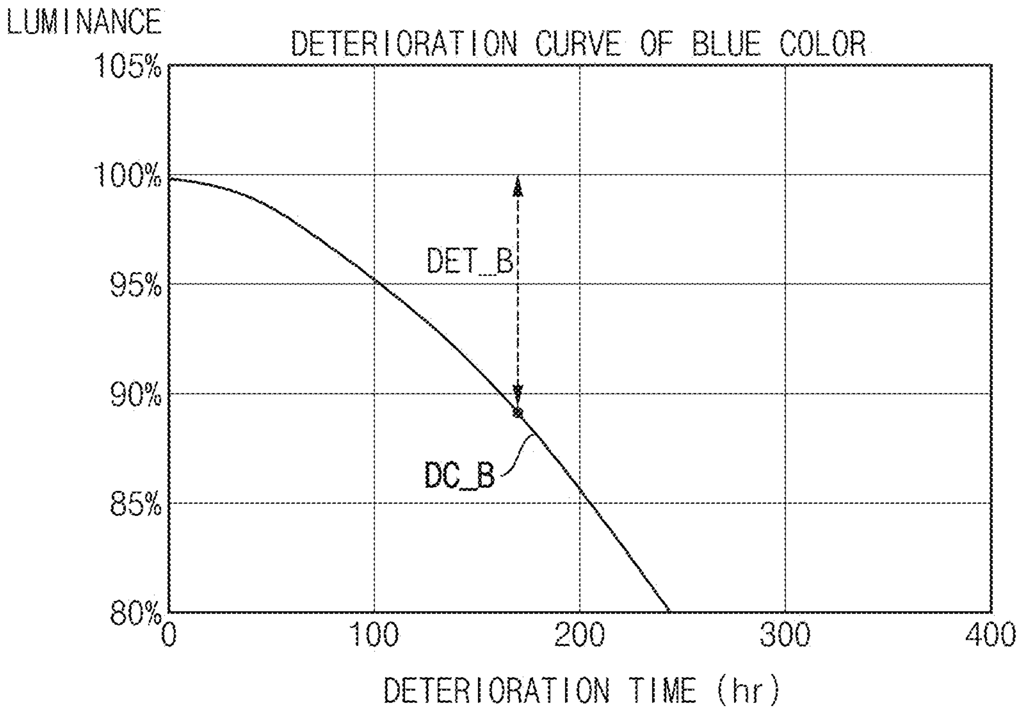
Figure 8:
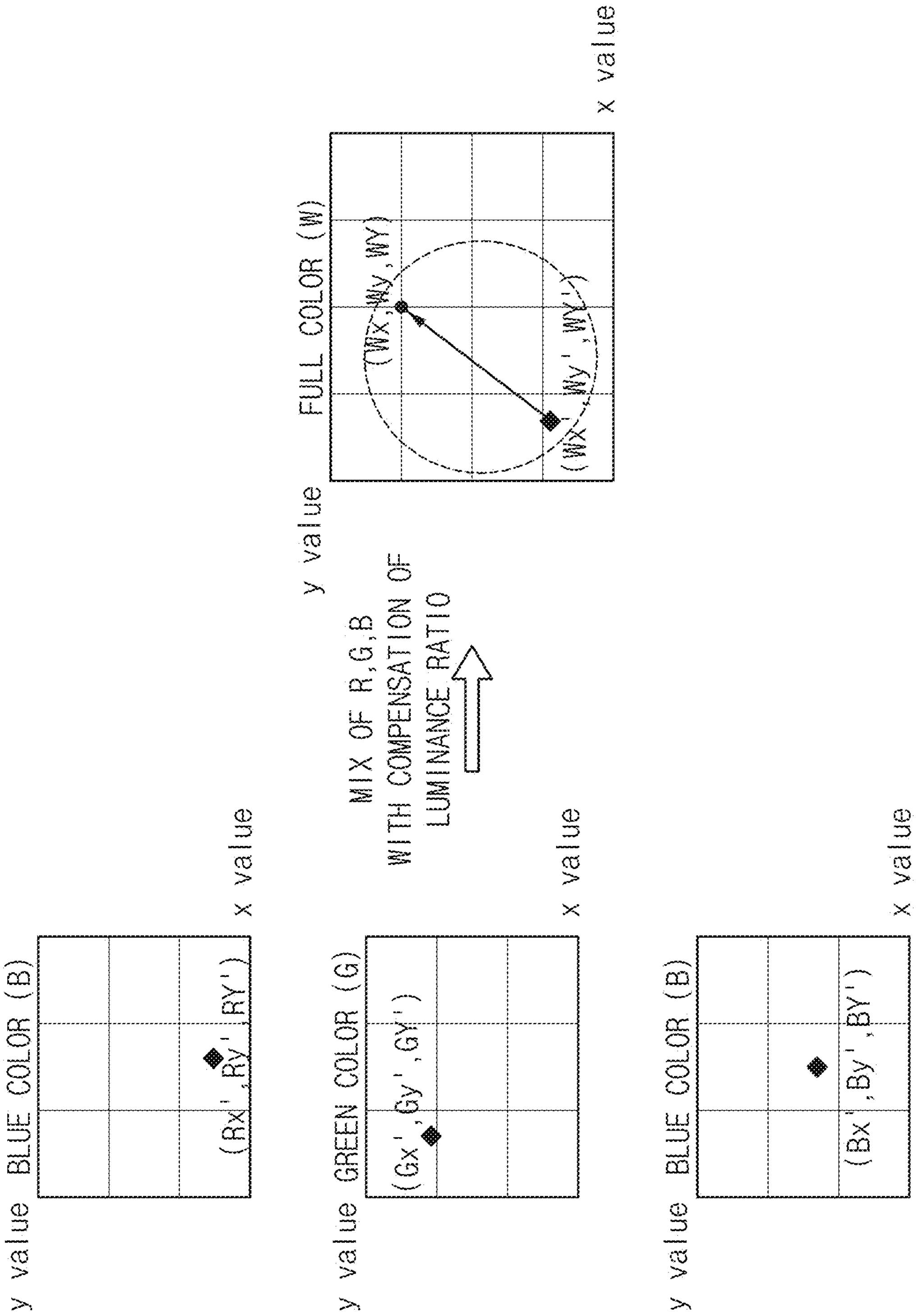
FIG. 8 is a schematic diagram illustrating an example of an operation of a color coordinate compensator of FIG. 4.
Figure 9:
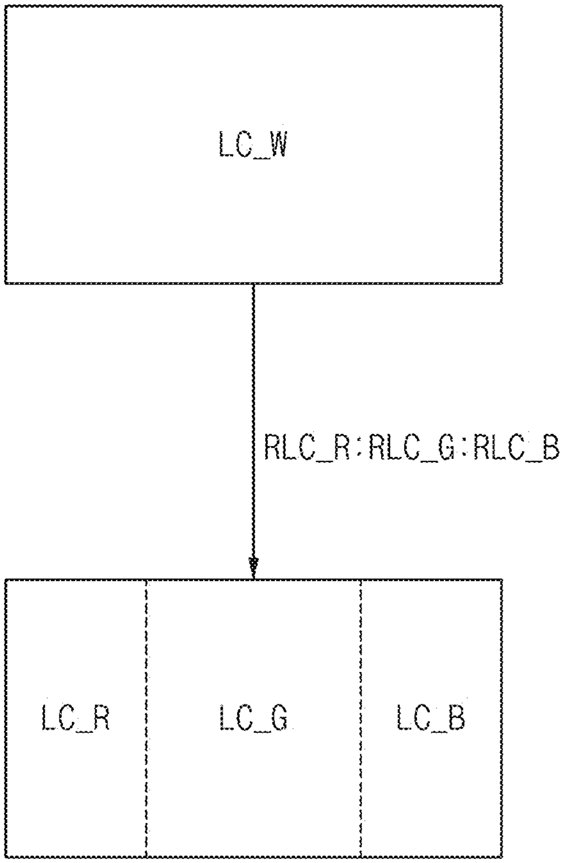
FIG. 9 is a schematic diagram illustrating an example of an operation of an image outputter of FIG. 4.
Figure 10:
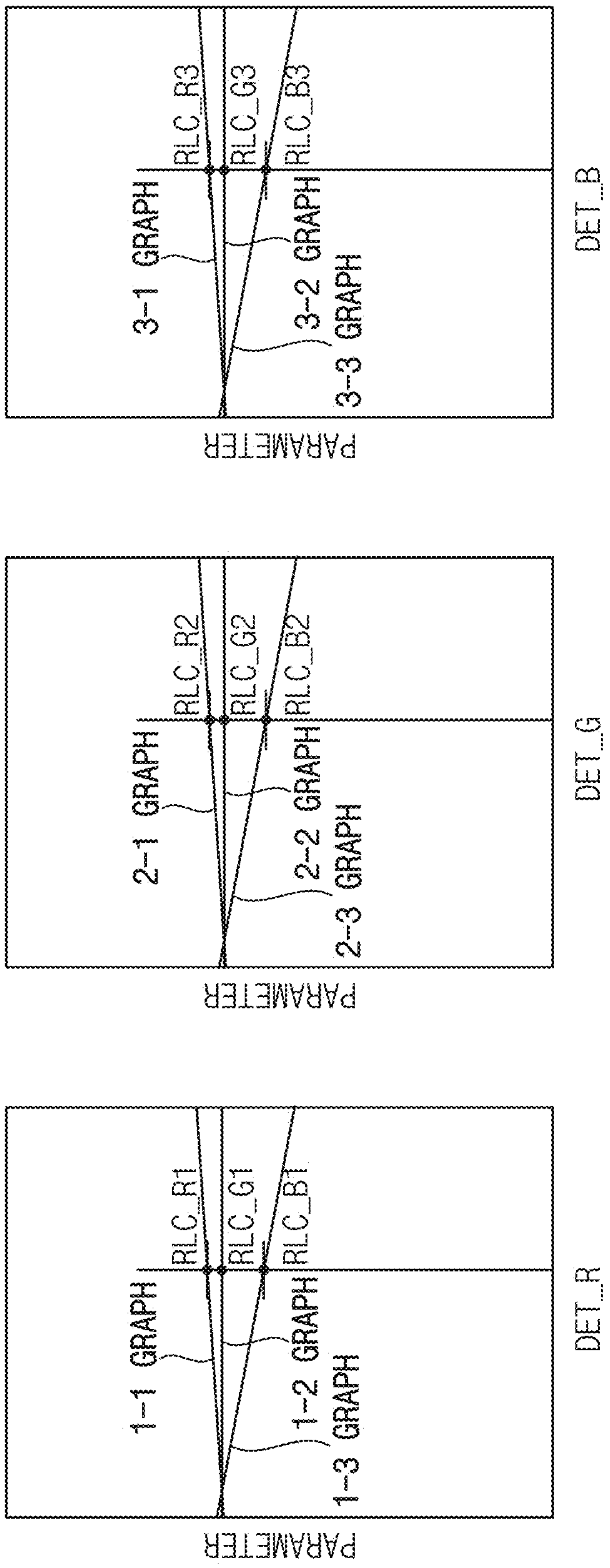
FIG. 10 is a schematic diagram illustrating a lookup table included in a color coordinate compensator of FIG. 4.

FIG. 4 is a block diagram illustrating the deterioration compensator 250 of FIG. 1. FIGS. 5 through 7 are graphs illustrating examples of an operation of a luminance compensator 254 of FIG. 4. FIG. 8 is a schematic diagram illustrating an example of an operation of a color coordinate compensator 256 of FIG. 4. FIG. 9 is a schematic diagram illustrating an example of an operation of an image outputter 258 of FIG. 4. FIG. 10 is a schematic diagram illustrating a lookup table included in the color coordinate compensator 256 of FIG. 4.

Referring to FIGS. 1 to 10, the deterioration compensator 250 may include the luminance compensator 254 and the color coordinate compensator 256. The deterioration compensator 250 may further include an image inputter 252 and the image outputter 258.

The image inputter 252 may receive the input image data IMG, the deterioration amount DET_R of the red color R, the deterioration amount DET_G of the green color G, and the deterioration amount DET_B of the blue color B. The image inputter 252 may provide the received deterioration amounts to the luminance compensator 254 and the color coordinate compensator 256.

The luminance compensator 254 may generate a luminance compensation value LC_W of the full color W, which is a sum of a luminance compensation value LC_R of the red color R, a luminance compensation value LC_G of the green color G, and a luminance compensation value LC_B of the blue color B, based on the input luminance of the full color W.

The luminance compensator 254 may compensate for the display luminance of the full color W by using a deterioration curve DC_R of the red color R, a deterioration curve DC_G of the green color G, and a deterioration curve DC_B of the blue color B. In more detail, the luminance compensator 254 may calculate the deterioration amount DET_R of the red color R according to a deterioration time of the red sub-pixel PSR by using the deterioration curve DC_R of the red color R, may calculate the deterioration amount DET_G of the green color G according to a deterioration time of the green sub-pixel PSG by using the deterioration curve DC_G of the green color G, and may calculate the deterioration amount DET_B of the blue color B according to a deterioration time of the blue sub-pixel PSB by using the deterioration curve DC_B of the blue color B. The luminance compensator 254 may generate the luminance compensation value LC_W of the full color W, which is a sum of the luminance compensation value LC_R of the red color R, the luminance compensation value LC_G of the green color G, and the luminance compensation value LC_B of the blue color B, based on the deterioration amount DET_R of the red color R, the deterioration amount DET_G of the green color G, the deterioration amount DET_B of the blue color B, and the input luminance of the full color W. The deterioration curve may be generated based on the display luminance according to the deterioration time. The deterioration curve may be different according to the red (R) color, the green (G) color, and the blue (B) color, may be different according to a grayscale, and/or may be different according to a temperature, a cell, and/or the like. The input luminance of the full color W may be the luminance of the full color W before the red sub-pixel PSR, the green sub-pixel PSG, and the blue sub-pixel PSB are deteriorated.

For example, when at least one of the red sub-pixel PSR, the green sub-pixel PSG, and/or the blue sub-pixel PSB is deteriorated, the display luminance of the full color W may be increased or decreased. When the display luminance of the full color W is increased by an increased value, the luminance compensator 254 may decrease the display luminance of the full color W by the increased value of the display luminance of the full color W to compensate the display luminance of the full color W to the input luminance of the full color W. When the display luminance of the full color W is decreased by a decreased value, the luminance compensator 254 may increase the display luminance of the full color W by the decreased value of the display luminance of the full color W to compensate the display luminance of the full color W to the input luminance of the full color W.

For example, the input luminance of the red color R may be 20 nit, the input luminance of the green color G may be 70 nit, and the input luminance of the blue color B may be 10 nit. In this case, the input luminance of the full color W may be 100 nit (=20+70+10). The display luminance of the red sub-pixel R may be decreased to 15 nit according to the deterioration time of the red sub-pixel PSR, the deterioration time of the green sub-pixel PSG, and the deterioration time of the blue sub-pixel PSB. The display luminance of the green sub-pixel G may be decreased to 65 nit, and the display luminance of the blue sub-pixel B may be decreased to 5 nit. In this case, the display luminance of the full color W may be 85 nit (=15+65+5). The decrease rate of the display luminance of the red color R (e.g., the deterioration amount DET_R of the red color R) may be (20-15)*100/20%, the decrease rate of the display luminance of the green color G (e.g., the deterioration amount DET_G of the green color G) may be (70−65)*100/70%, and the decrease rate of the display luminance of the blue color B (e.g., the deterioration amount DET_B of the blue color B) may be (10−5)*100/10%. In this case, the luminance compensator 254 may compensate the display luminance of the full color W of 85 nit to the input luminance of the full color W of 100 nit. Thus, the luminance compensator 254 may increase the display luminance of the full color W by 15(=5+5+5) nit. In other words, the luminance compensation value LC_W of the full color W may be 15 nit.

As described above, when the display luminance of the full color W is changed as the red sub-pixel PSR, the green sub-pixel PSG, and the blue sub-pixel PSB are deteriorated, the luminance compensator 254 may compensate the display luminance of the full color W by the luminance compensation value LC_W of the full color W to prevent or substantially prevent the luminance change ΔWY of the full color W.

As described above, when the red sub-pixel PSR, the green sub-pixel PSG, and the blue sub-pixel PSB are deteriorated, the input color coordinates Rx, Ry, and RY of the red color R may be changed to the display color coordinates Rx', Ry', and RY' of the red color R, the input color coordinates Gx, Gy, and GY of the green color G may be changed to the display color coordinates Gx', Gy', and GY' of the green color G, and the input color coordinates Bx, By, and BY of the blue color B may be changed to the display color coordinates Bx', By', and BY' of the blue color B. Accordingly, the input color coordinates Wx, Wy, and WY of the full color W may be changed to the display color coordinates Wx', Wy', and WY' of the full color, and the color coordinate deviation ΔWxy of the full color W may occur.

The input color coordinates Wx, Wy, and WY of the full color W may be determined based on the input color coordinates Rx, Ry, and RY of the red color R, the input color coordinates Gx, Gy, and GY of the green color G, the input color coordinates Bx, By, and BY of the blue color B, and the ratio of the input luminance of the full color W. The display color coordinates Wx', Wy', and WY' of the full color W may be determined based on the display color coordinates Rx', Ry', and RY' of the red color R, the display color coordinates Gx', Gy', and GY' of the green color G, the display color coordinates Bx', By', and BY' of the blue color B, and the ratio of the display luminance of the full color W. Thus, the display color coordinates Wx', Wy', and WY' of the full color W may be compensated for to the input color coordinates Wx, Wy, and WY of the full color W based on the display color coordinates Rx', Ry', and RY' of the red color R, the display color coordinates Gx', Gy', and GY' of the green color G, the display color coordinates Bx', By', and BY' of the blue color B, and a ratio RLC_RGB of the luminance compensation value LC_W of the full color W. The ratio RLC_RGB of the luminance compensation value LC_W of the full color W may be a ratio between the luminance compensation value LC_R of the red color R, the luminance compensation value LC_G of the green color G, and the luminance compensation value LC_B of the blue color B. Thus, the ratio RLC_RGB of the luminance compensation value LC_W of the full color W may be different from the ratio of the input luminance of the full color W.

The color coordinate compensator 256 may calculate the display color coordinates Rx', Ry', and RY' of the red color R based on the deterioration amount DET_R of the red color R, may calculate the display color coordinates Gx', Gy', and GY' of the green color G based on the deterioration amount DET_G of the green color G, may calculate the display color coordinates Bx', By', and BY' of the blue color B based on the deterioration amount DET_B of the blue color B, and may calculate the ratio RLC_RGB of the luminance compensation value LC_W of the full color W based on the display color coordinates Rx', Ry', and RY' of the red color R, the display color coordinates Gx', Gy', and GY' of the green color G, the display color coordinates Bx', By', and BY' of the blue color B, and the input color coordinates Wx, Wy, and WY of the full color.

In an embodiment, the x value (Rx') of the display color coordinates Rx', Ry', and RY' of the red color R may be calculated using Equation 1-1 (e.g., "Rx'=Rx+coff1-1*DET_R/50"), and the y value (Ry') of the display color coordinates Rx', Ry', and RY' of the red color R may be calculated using Equation 1-2 (e.g., "Ry'=Ry+coff1-2*DET_R/50"). Here, Rx' may be the x value of the display color coordinates Rx', Ry', and RY' of the red color R, Rx may be the x value of the input color coordinates Rx, Ry, and RY of the red color R, coff1-1 may be an x value coefficient of the red color R, DET_R may be the deterioration amount of the red color R, Ry' may be the y value of the display color coordinates Rx', Ry', and RY' of the red color R, Ry may be a y value of the input color coordinates Rx, Ry, and RY of the red color R, and coff1-2 may be a y value coefficient of the red color R. In an embodiment, coff1-1 may be 2/1000 and coff1-2 may be −25/10000. In addition, coff1-1 and coff1-2 may be calculated using the change amounts illustrated in FIG. 3. However, the present disclosure is not limited thereto. In addition, coff1-1 and coff1-2 may be changed according to a material characteristic of a light emitting device included in the pixel P.

In an embodiment, the x value (Gx') of the display color coordinates Gx', Gy', and GY' of the green color G may be calculated using Equation 2-1 (e.g., "Gx'=Gx+coff2-1*DET_G/50"), and the y value (Gy') of the display color coordinates Gx', Gy', and GY' of the green color G may be calculated using Equation 2-2 (e.g., "Gy'=Gy+coff2-2*DET_G/50"). Here, Gx' may be the x value of the display color coordinates Gx', Gy', and GY' of the green color G, Gx may be the x value of the input color coordinates Gx, Gy, and GY of the green color G, coff2-1 may be an x value coefficient of the green color G, DET_G may be the deterioration amount of the green color G, Gy' may be the y value of the display color coordinates Gx', Gy', and GY' of the green color G, Gy may be a y value of the input color coordinates Gx, Gy, and GY of the green color G, and coff2-2 may be a y value coefficient of the green color G. In an embodiment, coff2-1 may be −8/1000, and coff2-2 may be 4/1000. In addition, coff2-1 and coff2-2 may be calculated using the change amounts illustrated in FIG. 3. However, the present disclosure is not limited thereto. In addition, coff2-1 and coff2-2 may be changed according to a material characteristic of a light emitting device included in the pixel P.

In an embodiment, the x value (Bx') of the display color coordinates Bx', By', and BY' of the blue color B may be calculated using Equation 3-1 (e.g., "Bx'=Bx+coff3-1*DET_B/50"), and the y value (By') of the display color coordinates Bx', By', and BY' of the blue color B may be calculated using Equation 3-2 (e.g., "By'=By+coff3-2*DET_B/50"). Here, Bx' may be the x value of the display color coordinates Bx', By', and BY' of the blue color B, Bx may be an x value of the input color coordinates Bx, By, and BY of the blue color B, coff3-1 may be an x value coefficient of the blue color B, DET_B may be the deterioration amount of the blue color B, By' may be the y value of the display color coordinates Bx', By', and BY' of the blue color B, By may be a y value of the input color coordinates Bx, By, and BY of the blue color B, and coff3-2 may be a y value coefficient of the blue color B. In an embodiment, coff3-1 may be 0/1000, and coff3-2 may be −3/1000. In addition, coff3-1 and coff3-2 may be calculated using the change amounts illustrated in FIG. 3. However, the present disclosure is not limited thereto. In addition, coff2-1 and coff2-2 may be changed according to a material characteristic of a light emitting device included in the pixel P.

The input color coordinates Wx, Wy, and WY of the full color W may be calculated based on the input color coordinates Rx, Ry, and RY of the red color R, the input color coordinates Gx, Gy, and GY of the green color G, the input color coordinates Bx, By, and BY of the blue color B, and the ratio of the input luminance of the full color W. In more detail, the x value (Wx) of the input color coordinates Wx, Wy, and WY of the full color W may be calculated using Equation 4-1 below, the y value (Wy) of the input color coordinates Wx, Wy, and WY of the full color W may be calculated using Equation 4-2 below, and the Y value (WY) of the input color coordinates Wx, Wy, and WY of the full color W may be calculated using Equation 4-3 below.

$$Wx = \frac{\frac{Rx}{Ry} \times RY + \frac{Gx}{Gy} \times GY + \frac{Bx}{By} \times BY}{\frac{1}{Ry} \times RY + \frac{1}{Gy} \times GY + \frac{1}{By} \times BY} \quad \text{Equation 4-1}$$

$$Wy = \frac{RY + GY + BY}{\frac{1}{Ry} \times RY + \frac{1}{Gy} \times GY + \frac{1}{By} \times BY} \quad \text{Equation 4-2}$$

$$WY = RY + GY + BY \quad \text{Equation 4-3}$$

Here, Wx may be the x value of the input color coordinates Wx, Wy, and WY of the full color W, Wy may be the y value of the input color coordinates Wx, Wy, and WY of the full color W, and WY may be the Y value of the full color W.

The color coordinate compensator 256 may calculate the ratio of the luminance compensation value LC_W of the full color W by using a parameter a, a parameter b, a parameter c, and a parameter d. In more detail, the parameter a may be calculated using Equation 5-1 (e.g., "a=Ry'*(Wx−Gx')/{Ry'*(Wx−Gx')−Gy'*(Wx−Rx')}"), the parameter b may be calculated using Equation 5-2 (e.g., "b=−Ry'/By'*{By'*(Wx−Gx')+Gy'*(Bx'−Wx)}/{Ry'*(Wx−Gx')−Gy'*(Wx−Rx')}"), the parameter c may be calculated using Equation 5-3 (e.g., "c={(Gy'−Wy)*Ry'*Wy}/(Gy'−Ry')"), and the parameter d may be calculated using Equation 5-4 (e.g., "d={(By'−Gy')*Ry'*(Gy'−Ry')}/By'"). Here, a may be the parameter a, b may be the parameter b, c may be the parameter c, and d may be the parameter d. Further, a parameter RLC_R of the red color R with respect to the ratio RLC_RGB of the luminance compensation value LC_W of the full color W may be calculated using Equation 6-1 (e.g., "RLC_R=a+b*RLC_B"), a parameter RLC_G of the green color G with respect to the ratio RLC_RGB of the luminance compensation value LC_W of the full color W may be calculated using Equation 6-2 (e.g., "RLC_G=1−RLC_R−RLC_B"), and a parameter RLC_B of the blue color B with respect to the ratio RLC_RGB of the luminance compensation value LC_W of the full color W may be calculated using Equation 6-3 (e.g., "RLC_B=(c−a)/(b−d)"). Here, RLC_R may be the parameter of the red color R with respect to the ratio RLC_RGB of the luminance compensation value LC_W of the full color W, RLC_G may be the parameter of the green color G with respect to the ratio RLC_RGB of the luminance compensation value LC_W of the full color W, and RLC_B may be the parameter of the blue color B with respect to the ratio RLC_RGB of the luminance compensation value LC_W of the full color W.

The image outputter 258 may compensate for the input image data IMG based on the luminance compensation value LC_W of the full color W and the ratio of the luminance compensation value LC_W of the full color W, and may output the data signal DATA.

For example, the input luminance of the red color R may be 20 nit, the input luminance of the green color G may be 70 nit, the input luminance of the blue color B may be 10 nit, the display luminance of the red color R may be 15 nit, the display luminance of the green color G may be 65 nit, and the display luminance of the blue color B may be 5 nit. In this case, the ratio (e.g., RCL_R:RCL_G:RCL_B) of the luminance compensation value LC_W of the full color W may be 3:10:2. Thus, the luminance compensation value LC_W of the full color W may be 15 nit (=5+5+5), the luminance compensation value LC_R of the red color R may be 3 nit (=15*3/(3+10+2)), the luminance compensation value LC_G of the green color G may be 10 nit (=15*10/(3+10+2)), and the luminance compensation value LC_B of the blue color B may be 2 nit (=15*2/(3+10+2)). Accordingly, the image outputter 258 may compensate for the red image data IMG_R by the luminance compensation value LC_R of the red color R of 3 nit, may compensate for the green image data IMG_G by the luminance compensation value LC_G of the green color G of 10 nit, and may compensate for the blue image data IMG_B by the luminance compensation value LC_B of the blue color B of 2 nit.

As described above, the deterioration compensator 250 may compensate the display luminance of the full color W to the input luminance of the full color W by compensating for the display luminance of the full color W by the luminance compensation value LC_W of the full color W, thereby preventing or substantially preventing the luminance change ΔWY of the full color W. In addition the deterioration compensator 250 may compensate the display color coordinates Wx', Wy', and WY' of the full color W to the input color coordinates Wx, Wy, and WY of the full color W by adjusting the ratio RLC_RGB of the luminance compensation value LC_W of the full color W, thereby preventing or substantially preventing the color coordinate deviation ΔWxy of the full color W.

As described above, in some embodiments, the color coordinate compensator 256 may calculate the ratio RLC_RGB of the luminance compensation value LC_W of the full color W by using Equations 1-1 to 6-3 described above, based on the deterioration amount DET_R of the red color R, the deterioration amount DET_G of the green color G, and the deterioration amount DET_B of the blue color B DET_B.

In order to reduce an operation time of the color coordinate compensator 256, in some embodiments, the color coordinate compensator 256 may include a lookup table including the ratio RLC_RGB of the luminance compensation value LC_W of the full color W corresponding to the deterioration amount DET_R of the red color R, the deterioration amount DET_G of the green color G, and the deterioration amount DET_B of the blue color B. The data stored in the lookup table may be determined by arranging Equations 1-1 to 6-3 described above.

In more detail, a graph 1-1, a graph 1-2, a graph 1-3, a graph 2-1, a graph 2-2, a graph 2-3, a graph 3-1, a graph 3-2, and a graph 3-3 (e.g., see FIG. 10) may be determined by arranging Equations 1-1 to 6-3 described above.

The graph 1-1, the graph 1-2, and the graph 1-3 may illustrate that only the red sub-pixel PSR is deteriorated. The graph 1-1 may represent a parameter RLC_R1 of the red color R with respect to the ratio RLC_RGB of the luminance compensation value LC_W of the full color W when only the red sub-pixel PSR is deteriorated according to the deterioration amount DET_R of the red color R. The graph 1-2 may represent a parameter RLC_G1 of the green color G with respect to the ratio RLC_RGB of the luminance compensation value LC_W of the full color W when only the red sub-pixel PSR is deteriorated according to the deterioration amount DET_R of the red color R. The graph 1-3 may represent a parameter RLC_B1 of the blue color B with respect to the ratio RLC_RGB of the luminance compensation value LC_W of the full color W when only the red sub-pixel PSR is deteriorated according to the deterioration amount DET_R of the red color R.

The graph 2-1, the graph 2-2, and the graph 2-3 may illustrate that only the green sub-pixel PSG is deteriorated. The graph 2-1 may represent a parameter RLC_R2 of the red color R with respect to the ratio RLC_RGB of the luminance compensation value LC_W of the full color W when only the green sub-pixel PSG is deteriorated according to the deterioration amount DET_G of the green color G. The graph 2-2 may represent a parameter RLC_G2 of the green color G with respect to the ratio RLC_RGB of the luminance compensation value LC_W of the full color W when only the green sub-pixel PSG is deteriorated according to the deterioration amount DET_G of the green color G. The graph 2-3 may represent a parameter RLC_B2 of the blue color B with respect to the ratio RLC_RGB of the luminance compensation value LC_W of the full color W when only the green sub-pixel PSG is deteriorated according to the deterioration amount DET_G of the green color G.

The graph 3-1, the graph 3-2, and the graph 3-3 may illustrate that only the blue sub-pixel PSB is deteriorated. The graph 3-1 may represent a parameter RLC_R3 of the red color R with respect to the ratio RLC_RGB of the luminance compensation value LC_W of the full color W when only the blue sub-pixel PSB is deteriorated according to the deterioration amount DET_B of the blue color B. The graph 3-2 may represent a parameter RLC_G3 of the green color G with respect to the ratio RLC_RGB of the luminance compensation value LC_W of the full color W when only the blue sub-pixel PSB is deteriorated according to the deterioration amount DET_B of the blue color B. The graph 3-3 may represent a parameter RLC_B3 of blue color B with respect to the ratio RLC_RGB of the luminance compensation value LC_W of the full color W when only the blue sub-pixel PSB is deteriorated according to the deterioration amount DET_B of the blue color B.

The lookup table may include a first lookup table, a second lookup table, and a third lookup table. The first lookup table may include the parameter RLC_R1 of the red color R, the parameter RLC_G1 of the green color G, and the parameter RLC_B1 of the blue color B according to the deterioration amount DET_R of the red color R. The second lookup table may include the parameter RLC_R2 of the red color R, the parameter RLC_G2 of the green color G, and the parameter RLC_B2 of the blue color B according to the deterioration amount DET_G of the green color G. The third lookup table may include the parameter RLC_R3 of the red color R, the parameter RLC_G3 of the green color G, and the parameter RLC_B3 of the blue color B according to the deterioration amount DET_B of the blue color B.

The parameter RLC_R of the red color R with respect to the ratio RLC_RGB of the luminance compensation value LC_W of the full color W may be a product of the parameter RLC_R1 of the red color R, the parameter RLC_R2 of the red color R, and the parameter RLC_R3 of the red color R. The parameter RLC_G of the green color G with respect to the ratio RLC_RGB of the luminance compensation value LC_W of the full color W may be a product of the parameter RLC_G1 of the green color G, the parameter RLC_G2 of the green color G, and the parameter RLC_G3 of the green color G. The parameter RLC_B of the blue color B with respect to the ratio RLC_RGB of the luminance compensation value LC_W of the full color W may be a product of the parameter RLC_B1 of the blue color B, the parameter RLC_B2 of the blue color B, and the parameter RLC_B3 of the blue color B.

Thus, the color coordinate compensator 256 may calculate the ratio RLC_RGB of the luminance compensation value LC_W of the full color W by using the first lookup table, the second lookup table, and the third lookup table, based on the deterioration amount DET_R of the red color R, the deterioration amount DET_G of the green color G, and the deterioration amount DET_B of the blue color B.

Figure 11:
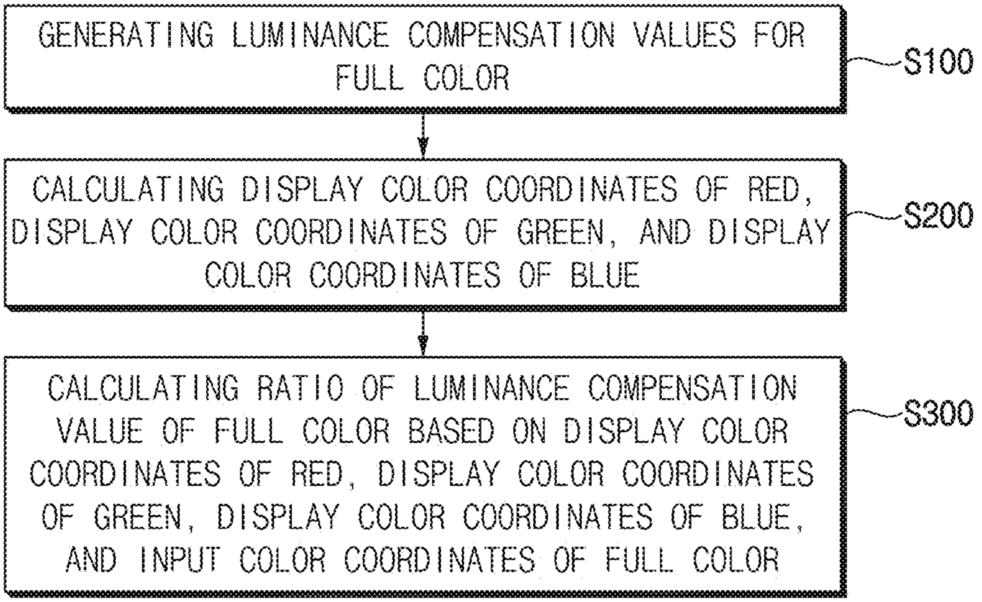
FIG. 11 is a flowchart illustrating a method of compensating for a deterioration of a display panel according to an embodiment of the present disclosure.

FIG. 11 is a flowchart illustrating a method of compensating for a deterioration of the display panel 100 according to an embodiment of the present disclosure.

Referring to FIGS. 1 to 11, the method of compensating for a deterioration of the display panel 100 according to an embodiment of the present disclosure includes generating a luminance compensation value LC_W for a full color W (S100), which is a sum of a luminance compensation value LC_R of the red color R, a luminance compensation value LC_G of the green color G, and a luminance compensation value LC_B of the blue color B, based on an input luminance of the full color W. Display color coordinates Rx', Ry', and RY' of the red color R may be calculated based on a deterioration amount DET_R of the red color R, display color coordinates Gx', Gy', and GY' of the green color G may be calculated based on a deterioration amount DET_G of the green color G, and display color coordinates Bx', By', and BY' of the blue color B may be calculated based on a deterioration amount DET_B of the blue color B (S200). A ratio RLC_RGB of the luminance compensation value LC_R of the full color W, which is a ratio between the luminance compensation value LC_R of the red color R, the luminance compensation value LC_G of the green color G, and the luminance compensation value LC_B of the blue color B, may be calculated based on the display color coordinates Rx', Ry', and RY' of the red color R, the display color coordinates Gx', Gy', and GY' of the green color G, the display color coordinates Bx', By', and BY' of the blue color B, and input color coordinates Wx, Wy, and WY of the full color W (S300).

Figure 12:
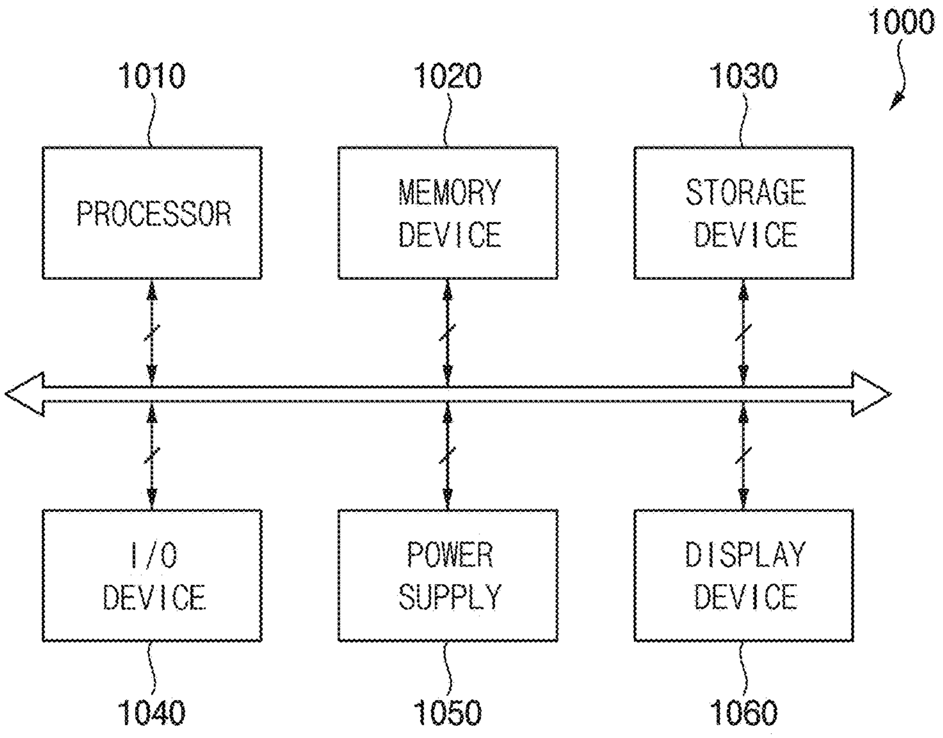
FIG. 12 is a block diagram illustrating an electronic device.
Figure 13:
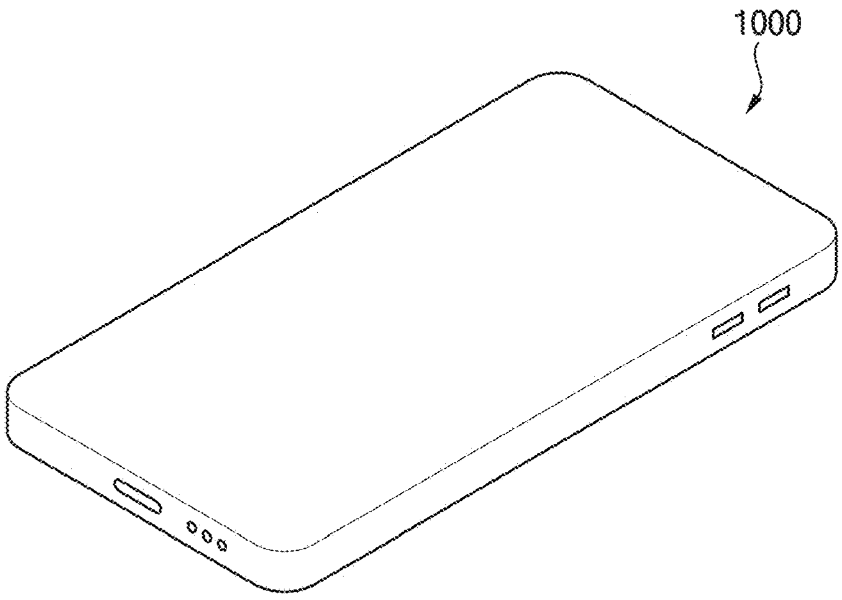
FIG. 13 is a perspective view illustrating an example of the electronic device of FIG. 12 implemented in an embodiment of a smart phone device.

FIG. 12 is a block diagram illustrating an electronic device 1000. FIG. 13 is a perspective view illustrating an example of the electronic device 1000 of FIG. 12 implemented in an embodiment of a smart phone device.

Referring to FIGS. 12 and 13, the electronic device 1000 may include a processor 1010, a memory device 1020, a storage device 1030, an input/output (I/O) device 1040, a power supply 1050, and a display device 1060. The display device 1060 may be the display device 10 illustrated in FIG. 1. In addition, the electronic device 1000 may further include a plurality of ports for communicating with a video card, a sound card, a memory card, a universal serial bus (USB) device, another suitable electronic device, and the like.

In an embodiment, as illustrated in FIG. 13, the electronic device 1000 may be implemented as a smart phone. However, the present disclosure is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and/or the like.

The processor 1010 may perform various suitable computing functions. The processor 1010 may be a microprocessor, a central processing unit (CPU), an application processor (ΔP), and/or the like. The processor 1010 may be coupled to other components via an address bus, a control bus, a data bus, and/or the like. Further, the processor 1010 may be coupled to an extended bus, such as a peripheral component interconnection (PCI) bus.

The memory device 1020 may store data for operations of the electronic device 1000. For example, the memory device 1020 may include at least one nonvolatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and/or the like, and/or at least one volatile memory device, such as a dynamic random access memory (DRAM) device, a static random access memory (SRAM) device, a mobile DRAM device, and/or the like.

The storage device 1030 may include a solid state drive (SSD) device, a hard disk drive (HDD) device, a CD-ROM device, and/or the like.

The I/O device 1040 may include an input device, such as a keyboard, a keypad, a mouse device, a touch-pad, a touch-screen, and/or the like, and an output device, such as a printer, a speaker, and/or the like. In some embodiments, the I/O device 1040 may include the display device 1060.

The power supply 1050 may provide power for operations of the electronic device 1000.

The display device 1060 may be connected to other components through buses or other suitable communication links.

Some embodiments of the present disclosure described herein may be applied to any suitable display device and any suitable electronic device including a touch panel. For example, some embodiments of the present disclosure described herein may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, and/or the like.

The electronic or electric devices and/or any other relevant devices or components according to embodiments of the present disclosure described herein (e.g., the deterioration compensator, the image inputter, the luminance compensator, the color coordinates compensator, the image outputter, and/or the like) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:

a display panel comprising a pixel, the pixel comprising:

a red sub-pixel configured to display a red color;

a green sub-pixel configured to display a green color; and a blue sub-pixel configured to display a blue color; and a deterioration compensator configured to compensate for a deterioration of the pixel, the deterioration compensator comprising:

a luminance compensator configured to generate a luminance compensation value of a full color based on an input luminance of the full color, the luminance compensation value of the full color corresponding to a sum of a luminance compensation value of the red color, a luminance compensation value of the green color, and a luminance compensation value of the blue color; and a color coordinate compensator configured to:

calculate display color coordinates of the red color based on a deterioration amount of the red color;

calculate display color coordinates of the green color based on a deterioration amount of the green color;

calculate display color coordinates of the blue color based on a deterioration amount of the blue color; and calculate a ratio of the luminance compensation value of the full color based on the display color coordinates of the red color, the display color coordinates of the green color, the display color coordinates of the blue color, and input color coordinates of the full color, the ratio of the luminance compensation value of the full color corresponding to a ratio between the luminance compensation value of the red color, the luminance compensation value of the green color, and the luminance compensation value of the blue color, wherein the deterioration compensator is configured to:

calculate the deterioration amount of the red color by {(input luminance of the red color)−(display luminance of the red color)}*100/(the input luminance of the red color);

calculate the deterioration amount of the green color by {(input luminance of the green color)−(display luminance of the green color)}*100/(the input luminance of the green color); and calculate the deterioration amount of the blue color by {(input luminance of the blue color)−(display luminance of the blue color)}*100/(the input luminance of the blue color).

2. The display device of claim 1, wherein the deterioration compensator is configured to compensate for a display luminance of the full color to the input luminance of the full color based on the luminance compensation value of the red color, the luminance compensation value of the green color, and the luminance compensation value of the blue color.

3. The display device of claim 1, wherein the ratio of the luminance compensation value of the full color is different from a ratio of the input luminance of the full color, which corresponds to a ratio between an input luminance of the red color, an input luminance of the green color, and an input luminance of the blue color.

4. The display device of claim 3, wherein the deterioration compensator is configured to compensate for display color coordinates of the full color to the input color coordinates of the full color based on the ratio of the luminance compensation value of the full color.

5. The display device of claim 3, wherein the deterioration compensator is configured to calculate the input color coordinates of the full color based on input color coordinates of the red color, input color coordinates of the green color, input color coordinates of the blue color, and the ratio of the input luminance of the full color.

6. The display device of claim 1, wherein the deterioration compensator is configured to calculate an x value of the display color coordinates of the red color according to Rx'=Rx+coff1-1*DET_R/50, and a y value of the display color coordinates of the red color according to Ry'=Ry+coff1-2*DET_R/50, and wherein Rx' is the x value of the display color coordinates of the red color, Rx is an x value of input color coordinates of the red color, coff1-1 is an x value coefficient of the red color, DET_R is the deterioration amount of the red color, Ry' is the y value of the display color coordinates of the red color, Ry is a y value of the input color coordinates of the red color, and coff1-2 is a y value coefficient of the red color.

7. The display device of claim 6, wherein coff1-1 is 2/1000, and coff1-2 is −25/10000.

8. The display device of claim 1, wherein the deterioration compensator is configured to calculate an x value of the display color coordinates of the green color according to Gx'=Gx+coff2-1*DET_G/50, and a y value of the display color coordinates of the green color according to Gy'=Gy+coff2-2*DET_G/50, and wherein Gx' is the x value of the display color coordinates of the green color, Gx is an x value of input color coordinates of the green color, coff2-1 is an x value coefficient of the green color, DET_G is the deterioration amount of the green color, Gy' is the y value of the display color coordinates of the green color, Gy is a y value of the input color coordinates of the green color, and coff2-2 is a y value coefficient of the green color.

9. The display device of claim 8, wherein coff2-1 is −8/1000, and coff2-2 is 4/1000.

10. The display device of claim 1, wherein the deterioration compensator is configured to calculate an x value of the display color coordinates of the blue color according to Bx'=Bx+coff3-1*DET_B/50, and a y value of the display color coordinates of the blue color according to By'=By+coff3-2*DET_B/50, and wherein, Bx' is the x value of the display color coordinates of the blue color, Bx is an x value of input color coordinates of the blue color, coff3-1 is an x value coefficient of the blue color, DET_B is the deterioration amount of the blue color, By' is the y value of the display color coordinates of the blue color, By is a y value of the input color coordinates of the blue color, and coff3-2 is a y value coefficient of the blue color.

11. The display device of claim 10, wherein coff3-1 is 0/1000, and coff3-2 is −3/1000.

12. The display device of claim 1, wherein the color coordinate compensator comprises a lookup table comprising the ratio of the luminance compensation value of the full color corresponding to the deterioration amount of the red color, the deterioration amount of the green color, and the deterioration amount of the blue color.

13. The display device of claim 1, wherein the deterioration compensator further comprises:

an image inputter configured to receive input image data, the deterioration amount of the red color, the deterioration amount of the green color, and the deterioration amount of the blue color, and provide the received input image data and the deterioration amounts to the luminance compensator and the color coordinate compensator; and an image outputter configured to output a data signal by compensating for the input image data based on the luminance compensation value of the full color and the ratio of the luminance compensation value of the full color.

14. A method of compensating for a deterioration of a display panel, the method comprising:

generating a luminance compensation value of a full color based on an input luminance of the full color, the luminance compensation value of the full color corresponding to a sum of a luminance compensation value of a red color, a luminance compensation value of a green color, and a luminance compensation value of a blue color;

calculating display color coordinates of the red color based on a deterioration amount of the red color;

calculating display color coordinates of the green color based on a deterioration amount of the green color;

calculating display color coordinates of the blue color based on a deterioration amount of the blue color; and calculating a ratio of the luminance compensation value of the full color based on the display color coordinates of the red color, the display color coordinates of the green color, the display color coordinates of the blue color, and input color coordinates of the full color, the ratio of the luminance compensation value of the full color corresponding to a ratio between the luminance compensation value of the red color, the luminance compensation value of the green color, and the luminance compensation value of the blue color, wherein the deterioration amount of the red color is calculated by {(input luminance of the red color)−(display luminance of the red color)}*100/(the input luminance of the red color), wherein the deterioration amount of the green color is calculated by {(input luminance of the green color)−(display luminance of the green color)}*100/(the input luminance of the green color), and wherein the deterioration amount of the blue color is calculated by {(input luminance of the blue color)−(display luminance of the blue color)}*100/(the input luminance of the blue color).

15. The method of claim 14, wherein a display luminance of the full color is compensated to the input luminance of the full color based on the luminance compensation value of the red color, the luminance compensation value of the green color, and the luminance compensation value of the blue color.

16. The method of claim 14, wherein the ratio of the luminance compensation value of the full color is different from a ratio of the input luminance of the full color, which corresponds to a ratio between an input luminance of the red color, an input luminance of the green color, and an input luminance of the blue color.

17. The method of claim 16, wherein display color coordinates of the full color are compensated to the input color coordinates of the full color based on the ratio of the luminance compensation value of the full color.

18. The method of claim 16, wherein the input color coordinates of the full color are calculated based on input color coordinates of the red color, input color coordinates of the green color, input color coordinates of the blue color, and the ratio of the input luminance of the full color.

* * * * *